United States Patent [19]

Stoll

[11] 4,244,280
[45] Jan. 13, 1981

[54] PISTON FOR A PNEUMATIC CYLINDER

[76] Inventor: Kurt Stoll, Lenzhalde 72, 7300 Esslingen/N, Fed. Rep. of Germany

[21] Appl. No.: 952,603

[22] Filed: Oct. 18, 1978

[51] Int. Cl.³ .......................... F01B 31/10; F16J 1/06; F16J 9/00
[52] U.S. Cl. ......................................... 92/159; 92/193; 92/249; 277/165
[58] Field of Search ................. 92/193, 159, 199, 200, 92/201, 205; 277/138, 139, 165

[56] References Cited

U.S. PATENT DOCUMENTS

| 343,065 | 6/1886 | Purves | 92/201 |
|---|---|---|---|
| 1,867,718 | 7/1932 | Towell | 92/193 |
| 1,868,075 | 7/1932 | Reiland et al. | 92/193 |
| 2,749,195 | 6/1956 | Kruger | 92/200 |
| 2,871,072 | 1/1959 | Parks et al. | 92/159 |
| 3,583,292 | 6/1971 | Garnier | 92/193 |
| 3,814,445 | 6/1974 | Bitzon | 277/165 |

FOREIGN PATENT DOCUMENTS

2440124 3/1975 Fed. Rep. of Germany .......... 277/165
756460 9/1956 United Kingdom ..................... 277/165

*Primary Examiner*—Paul E. Maslousky
*Attorney, Agent, or Firm*—Blanchard, Flynn, Thiel, Boutell & Tanis

[57] ABSTRACT

A piston for a pneumatic cylinder having a guide and sealing annular member extending around the circumference of the piston, and a resilient bearing member biassing the guide and sealing member in a direction for sealing engagement with the internal surface of the cylinder. The guide and sealing member has a plurality of axially consecutive, radially projecting sections for surface contact with the internal surface of the cylinder, each pair of adjacent sections defining a cavity therebetween. The material of the guide and sealing member between adjacent radially projecting sections of the guide and sealing member define a hinge-like connection therebetween.

7 Claims, 1 Drawing Figure

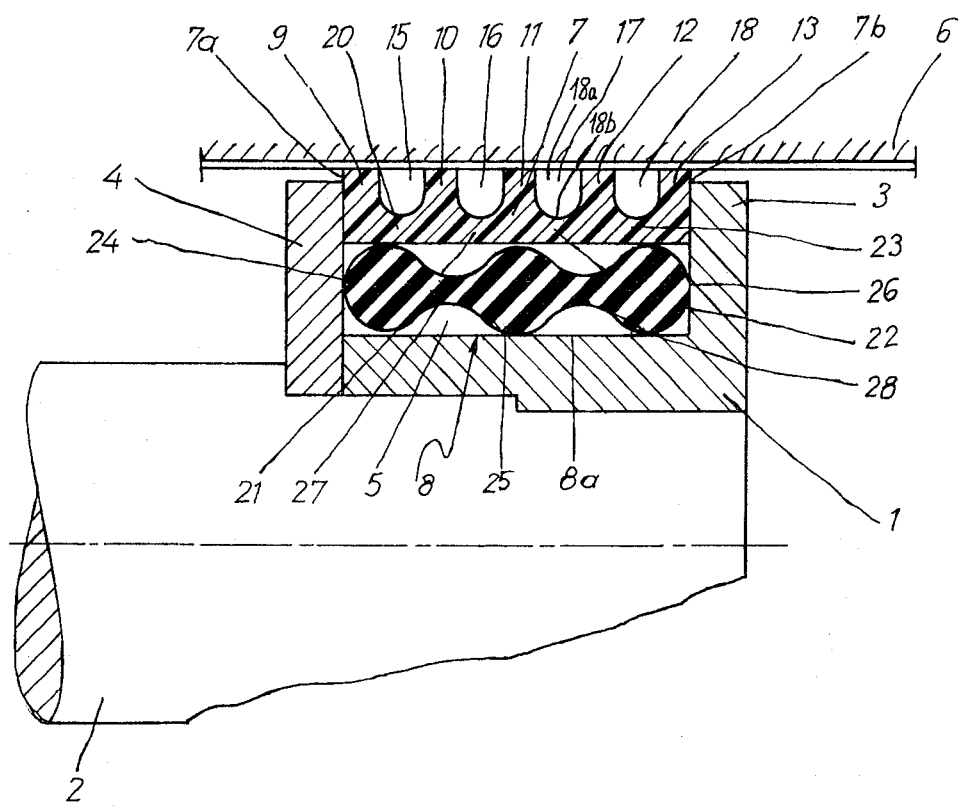

PISTON FOR A PNEUMATIC CYLINDER

FIELD OF THE INVENTION

This invention relates to a piston for a pneumatic cylinder.

BACKGROUND OF THE INVENTION

Pistons of the kind comprising a guide and sealing-ring located in an annular groove to extend around the piston circumference, and where the sealing-ring is biassed radially outwardly by a resilient bearing ring, comprise a flat guide and sealing ring, the cross-section of which is an elongated rectangle. The ring is located around an O-ring or a so-called "quad-ring" which biasses the guide or sealing ring radially outwards. As indicated by their name, these rings combine the function of a guide element—guiding the piston along the cylinder wall—with a sealing function, in that the two chambers which are separated from each other by the piston, are isolated one against the other. However, these known assemblies do not offer optimum sealing properties, quite apart from the fact that the guide and sealing rings, being rigid elements, may tilt or cant under certain conditions, and thus not only diminish the sealing effect but also adversely effect the guiding function of the ring.

With other known assemblies the piston is provided with two individual rings, one serving as a sealing ring and the other as a guide ring. With these assemblies however expenditure is excessive.

According to the present invention there is provided a piston for a pneumatic cylinder, said piston comprising a guide and sealing annular member extending around the circumference of the piston, and a resilient bearing member biasing the guide and sealing member in a direction for sealing engagement with the internal surface of the cylinder, the guide and sealing member comprising a plurality of axially consecutive, radially projecting sections for surface contact with the internal surface of the cylinder each pair of adjacent sections defining a cavity therebetween.

Preferably the sections of the guide and sealing member project radially by the same distance beyond a mounting assembly of the piston, the radially outer surfaces of the sections being contained in one common envelope plane. The external surfaces of the sections may be planar. The cavities between adjacent sections of the guide and sealing member define a hinge-like connection therebetween, the recesses which may for example open outwardly, having at their bases the contour of a circular arc. The advantages gained when using the new piston are its improved sealing power and its adaptability to discontinuities in the cylinder wall or varying cylinder tube diameters, and finally its improved guiding function which is consequential of its increased dimensions. The new assembly thus resembles a multiple piston ring type seal which includes between its individual seals, recessed spaces serving for the geometrical reduction of the material cross-section. The individual sealing sections thus have a guaranteed, radially elastic, function because of their hinge-like effect, and ensure optimum sealing conditions. The free spaces between the ring sections may for example be used as lubricant reservoirs. The guide and sealing member consists advantageously of a plastics material which offers the required sliding properties, for example a polyacetal. Preferably a plastics material is used which is commercially available under the name of "Hostaflon", a teflon and carbon alloy. By choosing the most suitable plastics material with optimum properties the multiple function sealing ring may offer additionally a satisfactory sliding power and thus may take up the function of a guide element.

The arrangement may for example be such that the resilient bearing ring comprises a plurality of axially consecutive bearing ring sections which are interconnected by thinner webs, the axially outermost sections being located opposite the axially outermost sections of the guide and sealing member.

Preferably the bearing ring is located within an opening defined in the mounting assembly and the bearing ring sections extend from one axial side of the opening to the other, and, while supported on the base of the opening serve as a bearing for the guide and sealing member. When a guide and sealing member is composed of five sections, the resilient bearing ring should preferably have three bearing ring sections. In this way it is ensured that the guide and sealing member is firmly and reliably pressed against the internal cylinder wall. The bearing ring may thereby consist of an elastically soft plastics material, for example of the known, commercially available, "Peruban".

It is especially advantageous when the axial length of the guide and sealing member and of the bearing ring are the same, and when the distance they cover in the axial direction exceeds that covered by known, comparable rings, being for example, 2 to 3 times as great. The advantage of the new arrangement is that the guide and sealing member is protected against canting by its increased axial length and that therefore a satisfactory and reliable piston control may be guaranteed. The good sealing properties of the ring are thus complemented by a very satisfactory piston guidance.

BRIEF DESCRIPTION OF THE DRAWING

An embodiment of the present invention will now be described, by way of example only, with reference to the single FIGURE of the accompanying drawing which is an axial sectional elevation of a preferred embodiment of the invention.

DETAILED DESCRIPTION

In the drawing, a piston 1 is mounted on a piston rod 2, the piston 1 having a mounting assembly comprising a part 3 and a mounting disc 4, made for example of steel. The mounting assembly defines an opening or recess 5 in which a guide and sealing ring 7 is controlled. The wall of a cylinder for the piston is indicated by the reference number 6.

The piston supports the guide and sealing ring 7 in the opening 5, which extends around the piston circumference in the form of an annular groove, and also accommodates a resilient bearing ring 8, whose function is to force the guide and sealing ring radially outwardly.

The guide and sealing ring 7 comprises a number of axially consecutive projecting sections 9, 10, 11, 12, 13 which are in surface contact with the internal circumference of the cylinder, each element constituting a disc-like sealing member. In the embodiment shown in the illustration the guide and sealing ring has five of these axially consecutive elements which are parallel to each other and, seen in the radial direction according to the arrow 14, project by the same distance beyond the end-faces of the mounting element 3 and the mounting disc 4, their external surfaces being contained in one, common envelope plane which is cylindrical and substantially coincides with the cylinder wall. The free spaces or cavities 15, 16, 17, 18 between the ring sections open towards the periphery 18a, their bases 18b following the contour of a circular arc. They serve on the one hand as a lubricant reservoir while on the other hand causing each pair of adjacent ring sections 9 and 10, or 10 and 11, or 11 and 12, or 12 and 13, to be connected with one another through thinner or weakened areas 20, 21, 22, 23 which act in the manner of a hinge or link, so that together they constitute a flexible unit which adapts itself readily to any discontinuity in the cylinder wall or to variations of the cylinder tube diameter, since each part of the ring may be flexibly displaced in the radial direction both outwards and inwards.

The guide and sealing ring 7 consists of a plastics material with good sliding properties, for example a polyacetal, preferably of a plastics material known commercially under the name of "Hostaflon", a Teflon/carbon alloy.

Apart from all other advantages the new arrangement provides for a better sealing effect than all comparable assemblies of this kind. Part of this improved sealing effect is attributable to the form of the resilient bearing ring 8 which consists of several axially consecutive bearing ring sections; in the embodiment shown in the drawing there are three sections 24, 25, 26 combined into an annular unit by thinner webs 27, 28, the thickness of which may for example correspond to half the diameter of the bearing ring sections. The outer sections 24 and 26 are located opposite to the axial end regions 7a and 7b of the guide and sealing ring. The bearing ring sections, each of them having a substantially cylindrical contour, extend in the axial direction from one side of the annular recess 5 to the other, and they are supported on the base 8a of the recess, their other surface serving as a supporting base for the guide and sealing ring.

The bearing ring 8 consists of an elastically soft material, for example the commercially available "Perbunan" which offers ideal resilient supporting conditions to the guide and sealing ring.

It is especially favourable to arrange the assembly in such a manner that the axial length of the guide and sealing ring 7 is equal to that of the bearing ring 8 as shown in the drawing, and that this axial length is considerably, for example 2 to 3 times, greater than the axial length of known comparable rings. With such an arrangement not only the sealing effect but also the guiding or control function are improved by the large supporting area which moreover contributes to a reduction of the stresses induced in the ring.

An assembly of the kind described above provides that the sealing effect will be reliable at any time, that the piston will be guided in an optimum manner, and that above all the ring will adapt itself to discontinuities in the cylinder wall and to variations of the cylinder tube diameter.

Various modifications may be made without departing from the invention.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a piston for a pneumatic working cylinder having an annular radially outwardly opening groove on the piston circumference, in which are arranged an outer guide and seal ring and a support ring made of an elastic material, said support ring engaging and urging radially outwardly the said guide and seal ring, wherein said guide and seal ring slidingly engages the inside circumference of a cylinder, the improvement comprising wherein said guide and seal ring is of said one-piece construction, wherein said guide and seal ring has plural guide portions arranged axially spaced from one another, said one-piece guide and seal ring having plural, axially spaced, outwardly opening, annular grooves in the radially outer surface thereof between said guide portions, wherein the material of said guide and seal ring adjacent the bottoms of said annular grooves each form a flexible connection between each pair of adjoining guide portions, and wherein said elastic support ring is of a unitary construction and consists of plural axially spaced support portions which are each connected through thinner web segments, said support portions engaging on the one side thereof the bottom of said annular groove and on the other side thereof the radially inner surface of said guide and seal ring.

2. The piston according to claim 1, wherein said plural annular groove have at the radially inner part thereof an arcuate contour.

3. The piston according to claim 1, wherein said plural annular grooves each include lubricant therein.

4. The piston according to claim 1, wherein said support ring has at least two axially spaced portions which engage the radially inwardly facing part of said guide and seal ring at opposite axial ends thereof.

5. The piston according to claim 1, wherein said guide and seal ring has five axially spaced guide ring portions and said support ring has three axially spaced support ring portions.

6. The piston according to claim 5, wherein said support ring portions have each an approximately cylindrical contour.

7. The piston according to claim 6, wherein the thickness of said thinner web segments between said support ring portions corresponds approximately with half the diameter of said support ring portions.

* * * * *

UNITED STATES PATENT AND TRADEMARK OFFICE
CERTIFICATE OF CORRECTION

PATENT NO. : 4 244 280
DATED : January 13, 1981
INVENTOR(S) : Kurt Stoll

It is certified that error appears in the above—identified patent and that said Letters Patent is hereby corrected as shown below:

On the title page and below "[22] Filed: Oct. 18, 1978" insert the following:

---Foreign Application Priority Data
Oct. 21, 1977 [DE] Fed. Rep. of Germany ....... 2747332---.

Column 4, line 20; change "a" to ---said---.

Column 4, line 21; change "said" (second occurrence) to ---a---.

Column 4, line 38; change "groove" to ---grooves---.

Signed and Sealed this

Ninth Day of June 1981

[SEAL]

Attest:

RENE D. TEGTMEYER

Attesting Officer     Acting Commissioner of Patents and Trademarks